United States Patent
Hagino

[19]

[11] Patent Number: 5,808,447
[45] Date of Patent: Sep. 15, 1998

[54] PULSE CHARGING METHOD FOR RECHARGEABLE BATTERIES

[75] Inventor: Tomohisa Hagino, Sumoto, Japan

[73] Assignee: Sanyo Electric Co., Ltd., Osaka, Japan

[21] Appl. No.: 798,924

[22] Filed: Feb. 12, 1997

[30] Foreign Application Priority Data

Feb. 29, 1996 [JP] Japan ................................ 8-042638

[51] Int. Cl.⁶ .................................................. H02J 7/04
[52] U.S. Cl. ............................ 320/139; 320/155; 320/162
[58] Field of Search .................................. 320/139, 141, 320/145, 148, 155, 162; 324/429

[56] References Cited

U.S. PATENT DOCUMENTS

| | | | |
|---|---|---|---|
| 4,056,764 | 11/1977 | Endo et al. | 320/101 |
| 4,736,150 | 4/1988 | Wagner | 320/139 |
| 5,291,117 | 3/1994 | Rydborn | 320/139 |
| 5,442,274 | 8/1995 | Tamai et al. | 320/146 |
| 5,606,240 | 2/1997 | Kokuga et al. | 320/129 |
| 5,684,386 | 11/1997 | Okada | 320/139 |

FOREIGN PATENT DOCUMENTS

| | | | |
|---|---|---|---|
| 2-119539 | 5/1990 | Japan. | |
| 6-113474 | 4/1994 | Japan. | |
| 09-007641 | 1/1997 | Japan | H01M 10/44 |
| 09-233726 | 9/1997 | Japan | H02J 7/04 |

*Primary Examiner*—Peter S. Wong
*Assistant Examiner*—Gregory J. Toatley, Jr.
*Attorney, Agent, or Firm*—Wenderoth, Lind & Ponack, L.L.P.

[57] ABSTRACT

This charging method repeatedly charges and suspends charging to pulse charge a rechargeable battery. Open circuit battery voltage is measured during periods of suspended charging and charging is resumed when the measured voltage drops below a specified voltage. When the period of suspended charging is longer than a specified time, open circuit battery voltage is compared to a minimum voltage. When the open circuit battery voltage is greater than the minimum voltage and the period of suspended charging is longer than the specified time, the battery is considered fully charged. When the open circuit battery voltage is less than the minimum voltage, even though the period of suspended charging is longer than the specified time, the battery is assumed to be removed from the system.

10 Claims, 4 Drawing Sheets

PULSE CHARGING METHOD FOR RECHARGEABLE BATTERIES

BACKGROUND OF THE INVENTION

This invention relates primarily to a pulse charging method for rechargeable batteries, and in particular to a charging method which can reliably sense full charge of a rechargeable battery.

The lithium ion rechargeable battery is a superior rechargeable battery. This is due to its extremely large charge capacity for a given volume and weight. Typically, constant current charging followed by constant voltage charging is the standard method of charging a lithium ion rechargeable battery. In this method, a battery is charged by constant current until a specified battery voltage (for example, 4.20 V) is reached. After the specified voltage is reached, charging is switched to constant voltage charging at the specified voltage to avoid battery voltage rise in excess of the specified value. This method allows charging time to be reduced by increasing the current during constant current charging. However, increasing the charging current too much, increases chances of battery performance degradation. Consequently, maximum charging current is limited to a value that will not induce battery performance degradation.

A charging method cited in Japanese Non-examined Patent Publication No.2-119539 issued May 7, 1990 reduces the time to fully charge a rechargeable battery by increasing the final battery voltage at the conclusion of constant current charging (to 4.40 V for instance) above the specified voltage (4.20 V) for subsequent constant voltage charging. Since initial constant current charging ends with a higher final voltage increasing charge capacity during that phase, total charging time can be reduced. Further, the higher the final voltage after constant current charging, the shorter the charging time. However, this method has the drawback that lithium ion rechargeable battery performance can degrade as the final voltage setting for constant current charging is increased.

Technology to eliminate this drawback and reduce charging time while preventing battery performance degradation by pulse charging has been developed (Japanese Non-examined Patent Publication No.6-113474 issued Apr. 22, 1994). In this method, initial charging is constant current charging until battery voltage rises to a first voltage (for example, 4.40 V). Next, constant voltage charging at the first voltage and suspension of charging are repeatedly alternated in a pulse charging phase. Finally, constant voltage charging at a second voltage (4.20 V) lower than the first voltage fully charges the battery after completion of pulse charging.

In the pulse charging phase of this charging method, charging is performed at a first voltage which is greater than the fully charged rechargeable battery voltage. However, since charging and suspension of charging are repeatedly alternated, battery performance degradation is prevented. Furthermore, charging time is reduced because charging is performed at the first voltage which is greater than the second voltage.

However, this method also has a drawback. Initial charging is constant current charging, followed by pulse charging, and finally constant voltage charging to full charge. As a result, the charging circuitry is complex. To eliminate this drawback, the present applicant developed an improved pulse charging method (Japanese Patent Application HEI7-92470 (1995)). In this method of repeatedly alternating charging and suspension of charging, battery voltage is measured during suspension of charging, charging is suspended until battery voltage drops to a specified voltage, and charging is resumed once battery voltage drops below the specified voltage. As shown by the battery voltage and charging current variation of FIG. 1, periods of suspended charging become longer as the rechargeable battery approaches full charge. This is because battery voltage drops more slowly in a rechargeable battery near full charge. Consequently, full charge can be determined by measuring the length of time charging is suspended.

This charging method has the feature that rechargeable battery charging can be implemented with simple circuitry. However, this method also is not without a drawback. If the battery is removed during charging, the system mistakenly determines that the battery has reached full charge. This is because when the battery is removed, charging current goes to zero and the period of suspended charging becomes greater than a specified time.

The present invention was developed to eliminate these drawbacks. Thus it is a primary object of the present invention is to provide a pulse charging method for rechargeable batteries which can reliably determine a fully charged battery and implement pulse charging with simple circuitry.

The above and further objects and features of the invention will more fully be apparent from the following detailed description with accompanying drawings.

SUMMARY OF THE INVENTION

The pulse charging method of the present invention charges a rechargeable battery by repeatedly alternating periods of charging and suspension of charging. When charging is suspended and charging current is zero, the battery's open circuit voltage is measured. The open circuit voltage is the battery voltage measured with the battery disconnected from the charging power supply. The measured open circuit voltage is compared with a specified voltage and charging is resumed if the open circuit battery voltage has dropped below the specified voltage. When the period of time that charging current is zero, that is the period from suspension of charging until open circuit battery voltage drops below the specified voltage, becomes longer than a specified time, the rechargeable battery is judged to be fully charged. This is because a fully charged rechargeable battery requires ample time for its voltage to drop below the specified voltage when charging is suspended.

In addition, the pulse charging method for rechargeable batteries of the present invention compares the measured open circuit battery voltage with a minimum voltage when the period of suspended charging with zero charging current exceeds the specified time. When the open circuit battery voltage is greater than the minimum voltage and the period of suspended charging is longer than the specified time, the rechargeable battery is judged to be fully charged. When the measured open circuit battery voltage is less than the minimum voltage even though the period of suspended charging is longer than the specified time, the rechargeable battery is judged to be removed not to be fully charged.

The pulse charging method of the present invention compares open circuit battery voltage with the minimum voltage when the period of suspended charging is greater than the specified time. The minimum voltage is set lower than the specified voltage and determines whether or not the battery is attached. As a rechargeable battery becomes fully charged, its open circuit voltage drops more slowly. Consequently, the period of suspended charging becomes greater than the specified time. However, if a fully charged battery is removed from the battery charger, charging current is zero and charging is suspended. If a rechargeable battery is removed from the charger, the period of suspended charging becomes greater than the specified time. When the period of suspended charging becomes greater than the specified time, the charging method of the present invention compares the open circuit battery voltage with the minimum voltage to determine if the battery is fully charged, or if the battery has been removed. If the battery has been removed, battery voltage is less than the minimum voltage because it is 0V. The charging method of the present invention thus judges a rechargeable battery to be fully charged if both the following conditions ① and ② are satisfied.

① The period of suspended charging is greater than the specified time.

② The open circuit battery voltage is greater than the minimum voltage.

A rechargeable battery is judged to be fully charged only when these two conditions apply. Even if the period of suspended charging is long, the rechargeable battery is assumed to be removed if the open circuit battery voltage is less than the minimum voltage. This condition is distinguished from a fully charged state.

Since the charging method of the present invention pulse charges a rechargeable battery as described above, it is characterized by simple circuit implementation and accurate full charge determination. This is because open circuit battery voltage is compared to the minimum voltage to determine full battery charge when the period of suspended charging is greater than the specified time. Full battery charge can be determined for a pulse charging method, where charging is suspended until open circuit battery voltage drops below a specified voltage, by measuring the time period of suspended charging. This is because the period of suspended charging becomes longer as the battery becomes fully charged. However, this type of charging method can mistakenly judge a partially charged battery which has been removed from the battery charger as fully charged. In the present invention, open circuit battery voltage is measured in addition to the time period of suspended charging. Because the present invention compares open circuit battery voltage to the minimum voltage, there is no mistake between full charge and charging with the battery removed.

The pulse charging method of the present invention is also characterized in that charging circuitry can be further simplified due to dual use of rechargeable battery protection circuitry for switching to accomplish pulse charging. Due to fortunate circumstances, almost without exception lithium ion rechargeable batteries house internal protection circuitry to prevent over-charging. This eliminates the need for switching circuitry to accomplish pulse charging. As a result, the pulse charging method of the present invention is an optimum charging method for lithium ion rechargeable batteries.

DETAILED DESCRIPTION OF THE INVENTION

Figure 1:
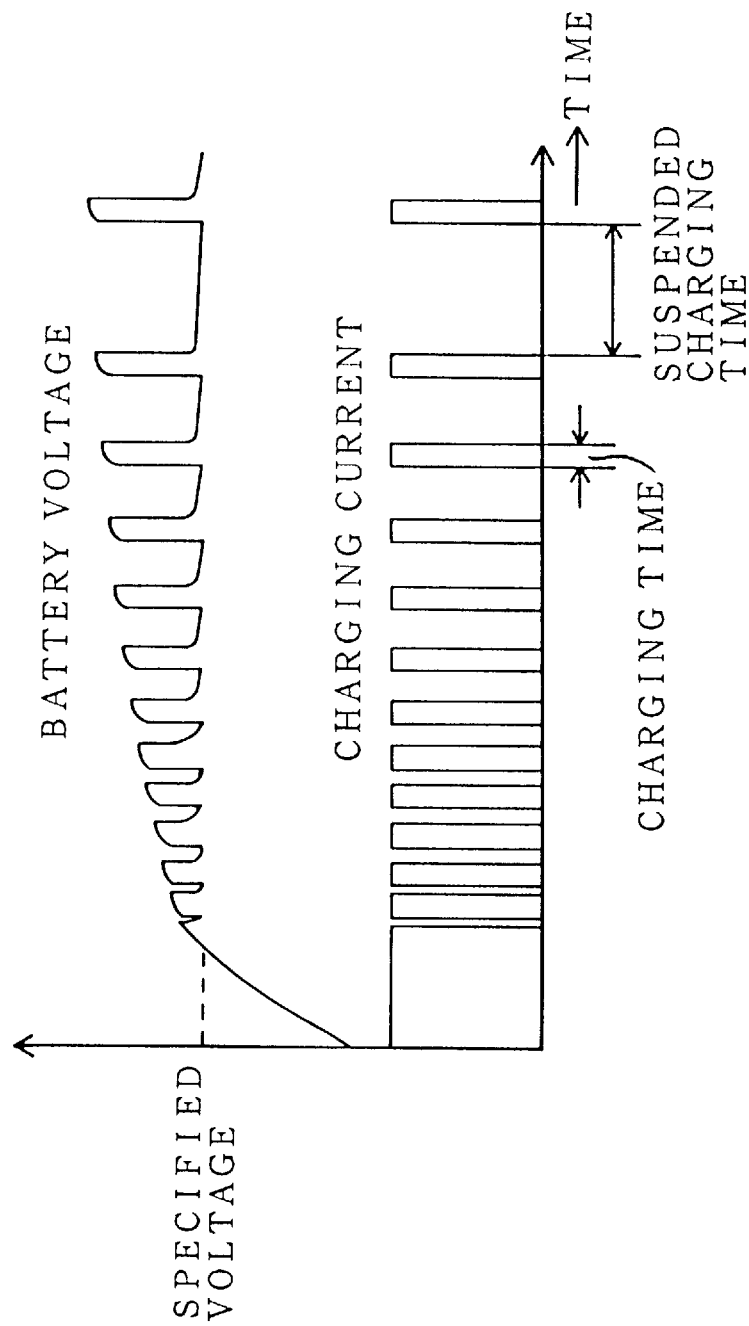
FIG. 1 is a graph showing battery voltage and charging current characteristics for a pulse charging method previously developed by the present inventor.
Figure 2:
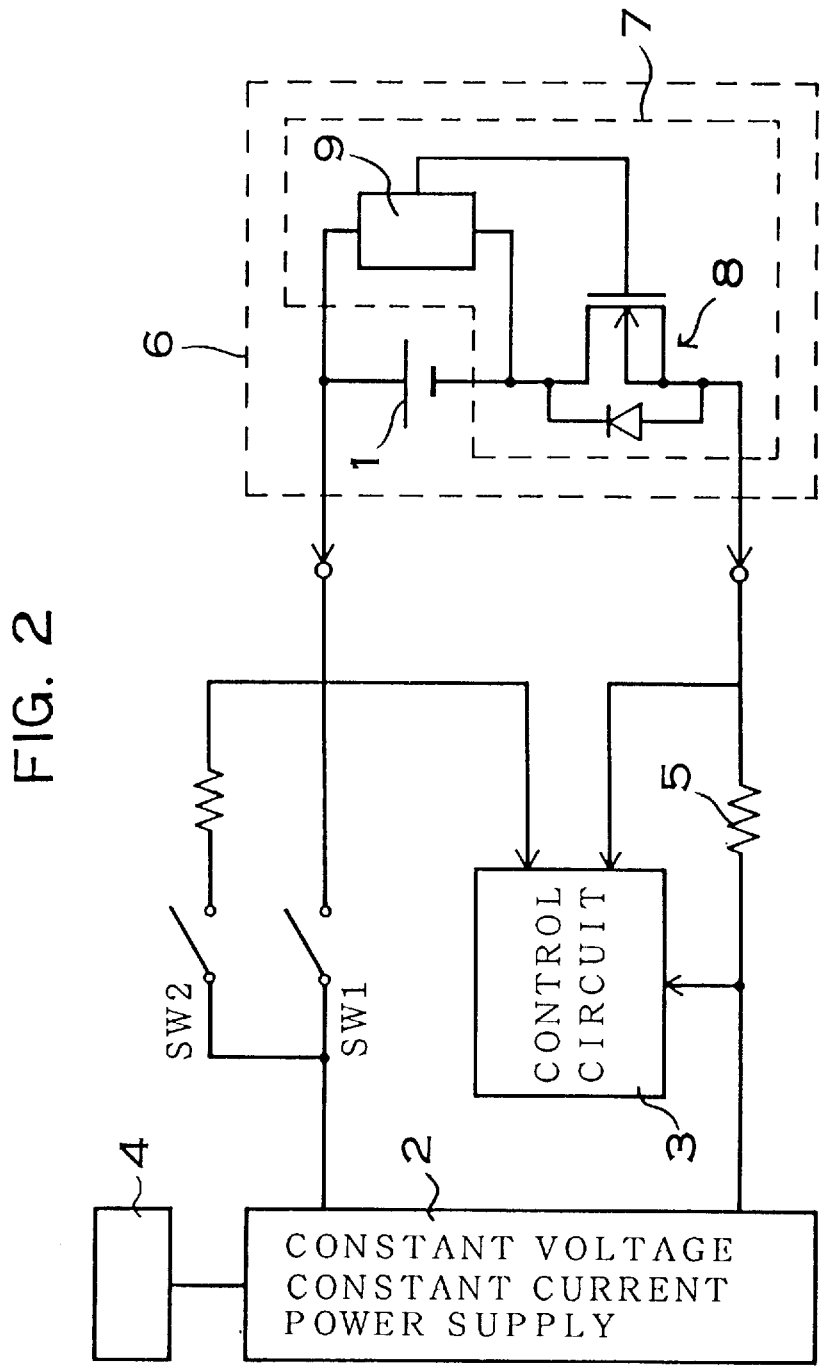
FIG. 2 is a circuit diagram of a charging circuit used in the pulse charging method of an embodiment of the present invention.

Turning to FIG. 2, a charging circuit and rechargeable battery 1 used in the pulse charging method of the present invention are shown. A charging circuit for a lithium ion rechargeable battery is shown. This charging circuit is provided with a constant voltage-constant current power supply 2 which inputs commercial power and outputs voltage and current suitable for charging rechargeable battery 1 which is a lithium ion rechargeable battery, a rapid charging switch SW1 and a trickle charging switch SW2 which are connected in parallel at the output side of the constant voltage-constant current power supply 2, a control circuit 3 which controls the rapid charging switch SW1 and the trickle charging switch SW2, a full charge display circuit 4 which displays the full charge status of rechargeable battery 1, and a current sensing resistor 5 which measures rechargeable battery 1 charging current.

The constant voltage-constant current power supply 2 is set, for example, to output a regulated voltage of 4.3 V/cell. The output current is set, for example, to a current capable of charging at 1C to 2C. The trickle charging switch SW2 is switched on when trickle charging the rechargeable battery 1 and is off at all other times. The rapid charging switch SW1 is switched on when rapidly charging the rechargeable battery 1 and is off at all other times.

The control circuit 3 measures rechargeable battery charging current and open circuit voltage, and controls on-off switching of the trickle charging switch SW2 and the rapid charging switch SW1.

A battery pack 6 which contains rechargeable battery 1 also houses a protection circuit 7. The protection circuit 7 measures rechargeable battery 1 voltage and suspends charging if battery voltage becomes greater than a specified voltage. The protection circuit 7 is provided with an FET switching device 8 connected in series with the rechargeable battery 1 and a voltage detection circuit 9 which measures battery voltage and controls the switching device 8.

The voltage detection circuit 9 switches the FET off if battery voltage exceeds the specified voltage. However, when battery voltage exceeds the specified voltage, the voltage detection circuit 9 does not immediately switch the FET off. When battery voltage exceeds the specified voltage, the FET is switched off after a fixed time interval has passed. The rechargeable battery 1 is pulse charged during the short time interval from the time the battery voltage exceeds the specified voltage until the FET is turned off. The pulse charging time of rechargeable battery 1 is regulated by the time to switch the FET off. After the FET switches off, the rechargeable battery 1 is no longer charged and the open circuit battery voltage gradually decreases. The voltage detection circuit 9 measures the decreasing open circuit battery voltage, and once again turns the FET on when the open circuit battery voltage drops below the specified voltage. This repeatedly charges the rechargeable battery 1 via pulse charging.

The charging circuit shown in FIG. 2 utilizes the protection circuit 7 for the dual purpose as the pulse charging control circuit. Consequently, the charging circuit does not require circuitry to pulse charge the rechargeable battery 1, and the charging circuit can be quite simple. However, in the pulse charging method of the present invention, the rechargeable battery may also be charged by a charging circuit specifically equipped with pulse charging circuitry.

Figure 3:
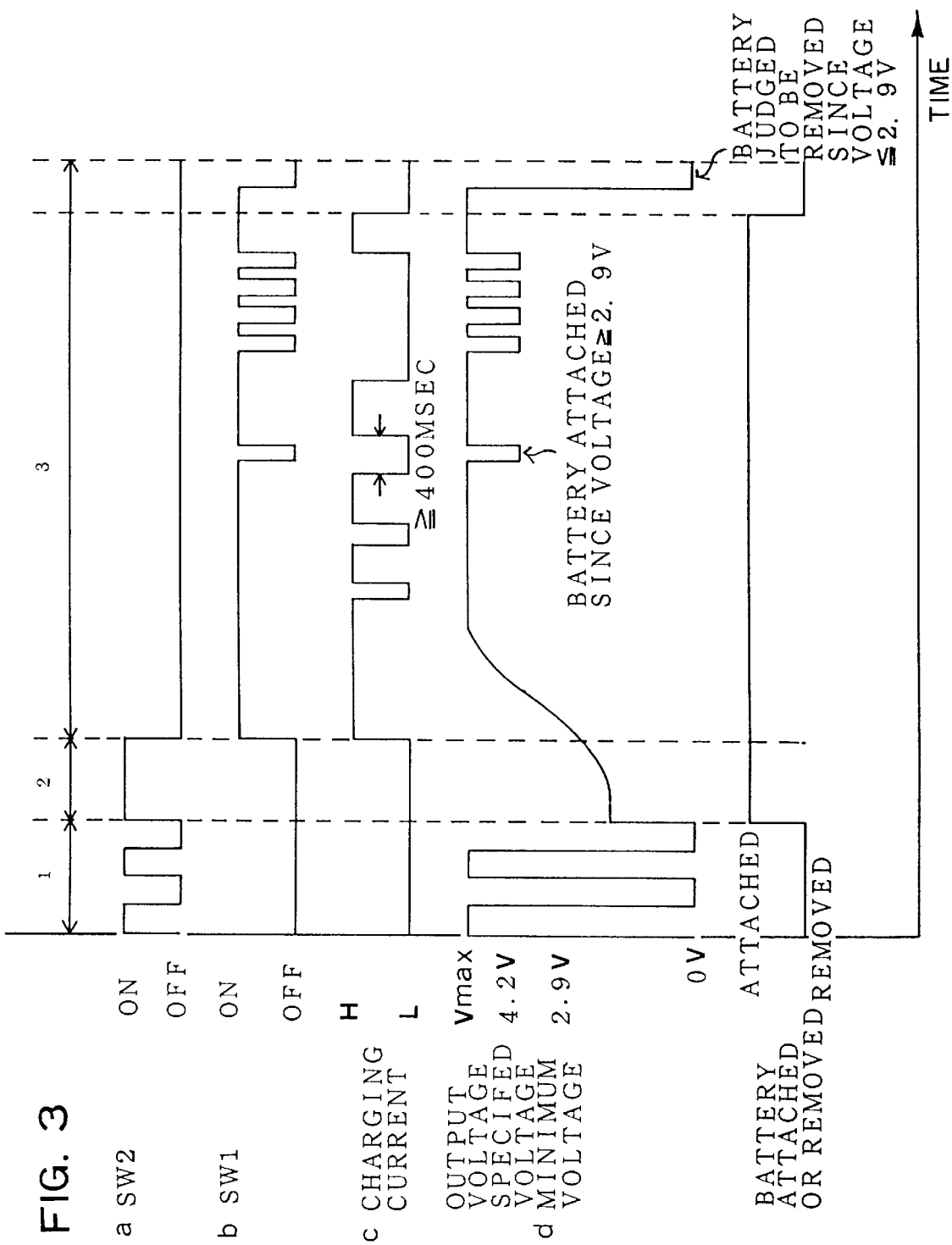
FIG. 3 is a timing chart for the charging circuit of an embodiment of the present invention.

The charging circuit shown in FIG. 2 charges the rechargeable battery 1 according to the timing chart shown in FIG. 3. The timing diagrams shown in FIG. 3 are in order from the top as follows:

a. the on-off state of the trickle charging switch;
b. the on-off state of the rapid charging switch;
c. the charging current level; and
d. the voltage at the output terminals of the constant voltage-constant current power supply.

Figure 4:
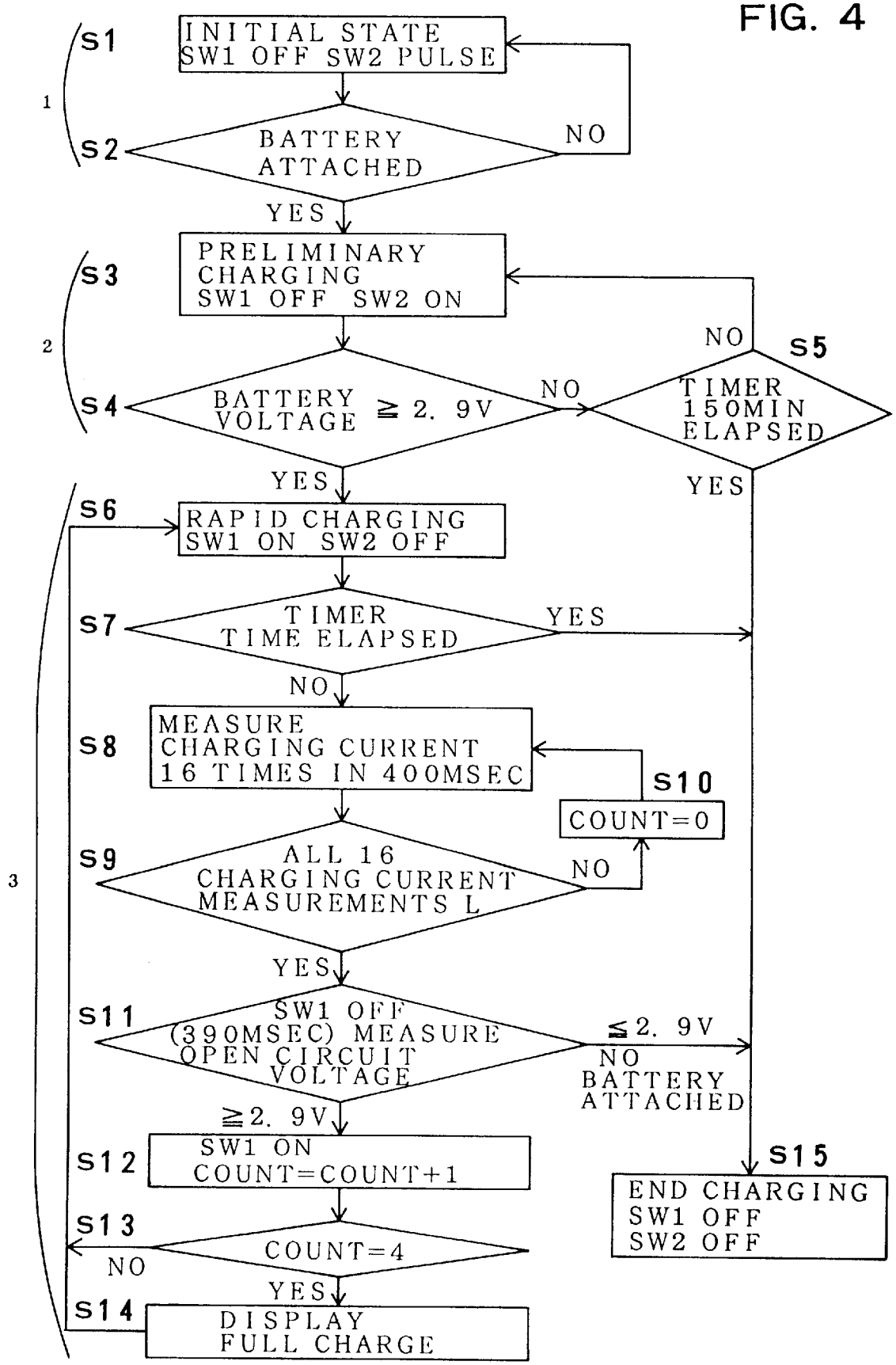
FIG. 4 is a flow-chart for charging a rechargeable battery with the charging circuit of an embodiment of the present invention.

Turning to FIG. 4, a flow-chart for charging rechargeable battery 1 according to the timing chart of FIG. 3 with the charging circuit of FIG. 2 is shown. Steps labeled ① through ③ in the flow-chart of FIG. 4 are shown as regions ① through ③ of the timing diagrams of FIG. 3. In the flow-chart of FIG. 4, rechargeable battery 1 is charged to full charge as follows.

①  The rapid charging switch SW1 is off and the trickle charging switch SW2 cycles on and off at a fixed period (S1). The control circuit 3 measures open circuit battery voltage with the rapid charging switch SW1 and the trickle charging switch SW2 in the off state, and determines if a battery is attached or not from the measured open circuit voltage (S2). If the rechargeable battery 1 is connected, open circuit battery voltage will not be 0V. If the rechargeable battery 1 is not connected, open circuit battery voltage will be approximately 0V. These steps (S1, S2) are looped through until a battery is attached.

② Here, preliminary charging of the rechargeable battery 1 is performed to determine if the battery is defective. The rapid charging switch SW1 is off and the trickle charging switch SW2 is on (S3).

The rechargeable battery 1 is trickle charged, battery voltage is measured, and the measured voltage is compared to a minimum voltage (S4). The minimum voltage is set, for example, at 2.9 V. Battery voltage is measured while the rechargeable battery 1 is in the state of being trickle charged. Flow proceeds to the next step when the battery voltage exceeds the minimum voltage of 2.9 V.

A battery which trickle charges for 150 min without battery voltage rising above the minimum voltage of 2.9 V is judged to be defective (S5). If the battery is judged to be defective, the trickle charging switch SW2 and the rapid charging switch SW1 are turned off and charging is ended (S15). A battery with battery voltage which does not go above 2.9 V even when trickle charged may, for example, be defective due to an internal short circuit.

③ Here, the rechargeable battery 1 is pulse charged. The trickle charging switch SW2 is control led to be off and the rapid charging switch SW1 is controlled to be on (S6).

When the rapid charging switch SW1 is turned on, battery voltage becomes greater than the specified voltage. This is because the constant voltage-constant current power supply 2 output voltage is greater than the specified voltage. The constant voltage-constant current power supply 2 output voltage is set, for example, to 4.3 V, while the specified voltage of the battery is set, for example, at 4.2 V. When battery voltage becomes greater than the specified voltage, the voltage detection circuit 9 of the protection circuit 7 detects this and turns the FET switching device 8 off after a fixed time interval. When the FET switches off, battery charging is suspended and open circuit battery voltage gradually drops. When open circuit battery voltage drops below the specified voltage, the voltage detection circuit 9 turns the FET on. Subsequently, this process is repeated and the rechargeable battery 1 is pulse charged.

While the FET is turned on and off to pulse charge the rechargeable battery 1, the control circuit 3 compares the total pulse charging time with a previously set specified time (S7). If the specified time of the timer expires, the rapid charging switch SW1 and the trickle charging switch SW2 are both turned off and charging is ended (S15).

In addition, the control circuit 3 measures charging current 16 times during a 400 msec interval (S8) and determines whether or not all the measured current values were low "L" (S9). Discrimination between low "L" and high "H" charging current is done, for example, by assigning "H" to charging current greater than 300 mA and "L" to charging current less than 300 mA. The threshold current separating "L" and "H" is set to an optimum value considering the capacity of the rechargeable battery 1. These steps (S8, S9) are looped through until all 16 charging current measurements are "L". When all 16 current measurements are not "L", a counter is reset to zero (S10) and flow loops through steps S8, S9.

When all 16 charging current measurements are "L", the rapid charging switch SW1 is temporarily switched off and open circuit battery voltage is measured. The open circuit battery voltage is compared to the minimum voltage (2.9 V) (S11). When the open circuit battery voltage is greater than 2.9 V, the rapid charging switch SW1 is switched on and the count is incremented by 1 (S12). When the open circuit battery voltage is less than 2.9 V, the battery is judged to be removed, the rapid charging switch SW1 and the trickle charging switch SW2 are maintained in the off state, and charging is ended (S15).

The count is tested to determine if it is 4 or not (S13). When all 16 current measurements made during the 400 msec interval are "L" for 4 counts, the rechargeable battery 1 is determined to be fully charged and full charge is displayed (S14).

When the battery is fully charged, flow then jumps to S6. If the specified time of the timer has elapsed, flow jumps to S15 and charging is ended.

In the charging method described above, battery charging current is measured at fixed intervals and the period of suspended charging is tested to determine whether or not it is longer than the specified time. In the pulse charging method of the present invention, the method of comparing the period of suspended charging to the specified time is not limited to the method described above. For example, suspended charging time could be compared to the specified time using a timer which starts a count when charging current becomes "L" and stops and resets the count when charging current becomes "H". In a method using this type of timer, the timer would output a signal when the count reached a set value and the suspended charging time would be measured against the specified time.

In the pulse charging method detailed above, the embodiment assumed a lithium ion battery as the rechargeable battery. The charging method of the present invention does limit the rechargeable battery for pulse charging to a lithium ion rechargeable battery. For example, pulse charging of a nickel cadmium battery or a nickel hydrogen battery, for instance, is also possible.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A pulse charging method for rechargeable batteries which repeatedly charges and suspends charging, wherein open circuit battery voltage is measured during periods of suspended charging, charging is resumed when the measured open circuit voltage drops below a specified voltage, and the rechargeable battery is assumed fully charged and charging is ended when the period of suspended charging becomes longer than a specified time; and characterized in that open circuit battery voltage is compared to a minimum voltage when the period of suspended charging is longer than the specified time, the rechargeable battery is judged to be fully charged when open circuit battery voltage is greater than the minimum voltage and the period of suspended charging is longer than the specified time, and the rechargeable battery is assumed to be removed when open circuit battery voltage is less than the minimum voltage even when the period of suspended charging is longer than the specified time.

2. A pulse charging method for rechargeable batteries as recited in claim 1 wherein the rechargeable battery protection circuit performs the switching to repeatedly charge and suspend charging based on open circuit battery voltage.

3. A pulse charging method for rechargeable batteries as recited in claim 1 wherein the rechargeable battery is a lithium ion rechargeable battery.

4. A pulse charging method for rechargeable batteries as recited in claim 1 wherein the rechargeable battery is a nickel cadmium rechargeable battery.

5. A pulse charging method for rechargeable batteries as recited in claim 1 wherein the rechargeable battery is a nickel hydrogen rechargeable battery.

6. A pulse charging method for rechargeable batteries as recited in claim 1 wherein trickle charging is performed for a set time period prior to rechargeable battery charging.

7. A pulse charging method for rechargeable batteries as recited in claim 6 wherein trickle charging is performed for a set time period prior to rechargeable battery charging, and the voltage of the trickle charged battery is measured to determine if the battery is defective.

8. A pulse charging method for rechargeable batteries as recited in claim 1 wherein a total pulse charging time is set, and charging is ended if this set time expires.

9. A pulse charging method for rechargeable batteries as recited in claim 1 wherein rechargeable battery charging current is measured at periodic intervals to determine suspended charging time.

10. A pulse charging method for rechargeable batteries as recited in claim 1 wherein a counter is started when charging current drops below a specified current, to determine suspended charging time.

* * * * *